(12) United States Patent
Bertozzini

(10) Patent No.: US 10,709,290 B2
(45) Date of Patent: Jul. 14, 2020

(54) CONTAINER FOR COOKING FOOD AND METHOD FOR ITS REALISATION

(75) Inventor: Giuseppe Alberto Bertozzini, Pesaro (IT)

(73) Assignee: TVS S.P.A., Urbino (PS) (IT)

( * ) Notice: Subject to any disclaimer, the term of this patent is extended or adjusted under 35 U.S.C. 154(b) by 1983 days.

(21) Appl. No.: 15/531,661

(22) PCT Filed: May 14, 2012

(86) PCT No.: PCT/IB2012/052392
§ 371 (c)(1),
(2), (4) Date: Sep. 6, 2017

(87) PCT Pub. No.: WO2012/153317
PCT Pub. Date: Nov. 15, 2012

(65) Prior Publication Data
US 2018/0020869 A1    Jan. 25, 2018

(30) Foreign Application Priority Data
May 12, 2011   (IT) .............................. VR2011A0101

(51) Int. Cl.
*A47J 36/02*   (2006.01)
*A47J 27/00*   (2006.01)
*B32B 15/01*   (2006.01)

(52) U.S. Cl.
CPC ............. *A47J 36/02* (2013.01); *A47J 27/002* (2013.01); *B32B 15/012* (2013.01)

(58) Field of Classification Search
CPC ........ A47J 36/02; A47J 27/002; B32B 15/012
See application file for complete search history.

(56) References Cited

U.S. PATENT DOCUMENTS

| 4,029,253 A | 6/1977 | Cartossi |
| 5,240,137 A | 8/1993 | Figueras |

(Continued)

FOREIGN PATENT DOCUMENTS

| DE | 4125114 | 7/1992 |
| DE | 20209827 | 10/2003 |

(Continued)

OTHER PUBLICATIONS

Sahin, M. (2008). Effect of surface roughness on weldability in aluminium sheets joined by cold pressure welding. Industrial Lubrication and Tribology, 60(5), 249-254. doi:http://dx.doi.org/10.1108/00368790810895187 (Year: 2008).*

(Continued)

*Primary Examiner* — Jacob J Cigna
(74) *Attorney, Agent, or Firm* — Tutunjian & Bitetto, P.C.

(57) ABSTRACT

A container for cooking food includes a first substantially concave element, made from a first metal material, and a second element, made from a second metal material, preferably ferromagnetic, externally fixed with respect to an area of the first element corresponding to the bottom of the container, the container moreover includes a third element internally fixed with respect to the area, made from the second metal material, or from a third metal material in which the first element, in its unrefined state, includes a supplementary annular portion constituting a continuous solid part of the first element, positioned near to the perimeter of the second element, and foreseen for flowing and moving near to the perimeter of the third element under the action of a punch and of a matrix; also a method for making the container is presented.

19 Claims, 5 Drawing Sheets

(56) References Cited

U.S. PATENT DOCUMENTS

| | | | |
|---|---|---|---|
| 5,694,674 A * | 12/1997 | Flammang | A47J 27/002 29/460 |
| 2006/0283844 A1 | 12/2006 | Cheng | |
| 2008/0099466 A1 * | 5/2008 | Cheng | A47J 36/02 219/621 |
| 2008/0142526 A1 * | 6/2008 | Cheng | A47J 36/02 220/573.1 |
| 2008/0156810 A1 * | 7/2008 | Cheng | A47J 27/002 220/573.1 |
| 2010/0206870 A1 * | 8/2010 | Ferron | A47J 27/002 219/621 |
| 2013/0068775 A1 * | 3/2013 | Maravic | A47J 27/002 220/573.1 |
| 2014/0361020 A1 * | 12/2014 | Cheng | A47J 36/02 220/573.1 |
| 2017/0119190 A1 * | 5/2017 | Juha | A47J 36/025 |

FOREIGN PATENT DOCUMENTS

| | | | |
|---|---|---|---|
| EP | 0411235 | 2/1991 | |
| EP | 0928587 | 7/1999 | |
| WO | WO-2007025200 A2 * | 3/2007 | ............ A47J 27/002 |
| WO | WO-2011064455 A1 * | 6/2011 | ............ A47J 27/002 |
| WO | WO-2015114581 A1 * | 8/2015 | ............ A47J 36/02 |

OTHER PUBLICATIONS

J54 Friction Screw Press. Datasheet [online]. Qingdao Hongda, 2011 [retrieved on Oct. 28, 2019]. Retrieved from the Internet: <URL: https://web.archive.org/web/20110307151920/http://www.hotforgingpress.com/en/productshow.aspx?id=187>. (Year: 2011).*

Machine Translation of de-20209827 (Year: 2003).*

International Search Report for PCT/IB2012/052392 dated Sep. 21, 2012 (3 pages).

* cited by examiner

CONTAINER FOR COOKING FOOD AND METHOD FOR ITS REALISATION

TECHNICAL FIELD OF THE INVENTION

The present invention concerns a container for cooking food, and the process for the production thereof.

More in particular, the present invention concerns a container for cooking food that is especially suitable for cooking on electromagnetic induction plates.

STATE OF THE ART

In the field of containers for cooking food, such as saucepans, pans, frying pans, and the like, it is known for there to be types of containers that are particularly, but not exclusively, suitable and indicated for cooking on modern electromagnetic induction plates.

Some of such containers are made up of a bottom made from ferromagnetic material and a bowl made from non-ferromagnetic material, which is fixed to such a bottom. The coupling of such components makes it possible to obtain a good technical result when using the container, in particular with heat sources of the induction type, since the bottom made from ferromagnetic material heats by eddy-current which are generated by effect of the magnetic field generated by the induction source, and transfers heat to the bowl made from non-ferromagnetic material; the latter then provides for cooking food.

The conventional process for making this type of containers mainly consists in carrying out the braze welding of the bottom in ferromagnetic material to the bowl made from non-ferromagnetic material, with the interposition of a further disc, by using a brazing alloy. The aforementioned braze welding is carried out by exerting a suitable pressure of the components on one another and by making the latter undergo heating up to a temperature of around 500° C. The heating is carried out by means of an induction device, in which some metal coils crossed by current induce an electromagnetic field which passes through the piece being machined. Such an electromagnetic field in turn induces eddy-currents in the bottom made from ferromagnetic material which thus reaches the desired temperature: the bottom finally heats the non-ferromagnetic material parts and the brazing alloy through conduction, so that all the components are welded together.

At the end of the braze welding process, the semi-finished product thus obtained is cooled to a temperature in which it can be safely manipulated, i.e., lower than 40° C.: after this cooling step the object has a bottom that is deformed, for example outwards. This phenomenon is due to the tensions exerted by the different thermal expansion coefficients of the different coupled metals. More in detail, it should be observed that the ferromagnetic material cools faster on the outside, i.e., at its free surface, rather than on the inside, i.e., at the surface in contact with the aluminum. This causes there to be a tensile stressing of the bottom of the frying pan outwards, with consequent deformation: the object, after being cooled down, therefore has the bottom which is not flat, but substantially convex towards the outside of the bowl.

Normally, the mentioned drawbacks must be eliminated before moving on to the following finishing steps, and therefore it is necessary to firstly carry out the so-called resetting of the concavity of the bottom of the object. This resetting is obtained by positioning the object on a template and by acting with a press provided with a special punch, so as to exert a suitable pressure on the bottom of the object.

Other techniques of fixing the steel bottom to the aluminum body are also known, for example, impact bonding impact bonding, which can have the same drawback in terms of deformation of the object.

Basically, the various thermal stresses that come after one another when machining the object determine the repeated expansion and contraction thereof, which can also occur again subsequently during use of the object itself. The occurrence of this phenomenon is, in reality, common to all technologies for making kitchen containers.

Currently, in order to minimize this undesired phenomenon, saucepans are designed with the parts of aluminum having great thickness, so that this contrasts the deformation due to the contraction of the ferromagnetic material.

There are however objects in which the thickness of the parts in aluminum must be kept small for the necessity of design, appearance, or others. In these situations, therefore, it is necessary to repeat the operation of resetting the concavity of the bottom also after the finishing operations of the container, like for example the painting and other ones. The operation of resetting the concavity obviously has a considerable impact on the overall time and costs of producing the object; moreover, it can lead to an increase in the amount of process waste.

In any case, the problem of the deformation of the bottom of the container can also reoccur during the normal use by the users: this leads to a certain separation of the bottom from the energy source constituted by the induction plate, with an obvious degradation of the properties of the object, especially of its thermal efficiency. Moreover, such a deformation has a negative impact on the cooking uniformity of the food, which can accumulate more at the edges of the bottom of the container with respect to the center thereof.

German utility model n. DE 202 09 827 U1 describes a container for cooking food comprising a bowl body made from non-ferromagnetic material, like aluminum or aluminum alloy, to which two plates made from ferromagnetic material are associated, for example chromium steel, one external and one internal with respect to the bowl body.

In one embodiment described in the model, the two plates are housed in respective seats with a shape corresponding to that of the aforementioned plates, with the purpose of eliminating steps between the bowl body and the plates themselves.

In a container like that described in document DE 202 09 827 U1 it should be observed in particular that the seat of the inner plate, during the forming of the container with the impact bonding technique, tends to deform in an uncontrolled manner leading to the formation of a groove between the bowl body and the inner plate: such a groove then unavoidably becomes a critical point, for example because food can accumulate there during cooking, which is then very difficult to remove completely.

SUMMARY OF THE INVENTION

The technical task of the present invention is therefore that of improving the state of the art in the field of containers for cooking food.

In the field of such a technical task, one purpose of the present invention is to devise a container for cooking food that is distinguished by an optimal stability of the bottom during use, i.e. during cooking on an energy source such as an induction plate or others.

Yet another purpose of the present invention is to devise a container for cooking food that is simple and cost-effective to make, in a particular manner by using apparatuses and equipment of the known and conventional type.

A further purpose of the present invention is that of making a container for cooking food that does not have shape defects, for example the formation of grooves or other, especially in the joint between ferromagnetic material and non-ferromagnetic material.

Such a task and such purposes are achieved with a container for cooking food according to the present specification.

Moreover, such a task and such purposes are achieved with a process for the production of a container for cooking food according to the present application.

The presence, in the container according to the present invention, of a third inner element—made from the same metal material as the second outer element or from a similar material,—minimizes or completely nullifies the curving effect of the bottom which, in know types of containers, is indeed due to the association of materials having different thermal expansion coefficients.

Moreover, the presence of a supplementary annular portion in the first element of the container makes it possible to obtain, in the forming step, a better adhesion and a complete contiguity between the first element and the third element, inside, the container itself.

The production process according to the invention moreover makes it possible to fix the second element and the third element to the first bowl element in a single step thanks to the pressing with the technique of impact bonding, therefore in a very rapid and cost-effective manner and using equipment and machines that are essentially of the known and conventional type, possibly already available from manufacturers which operate in this field.

The present application refers to preferred and advantageous embodiments of the invention.

BRIEF DESCRIPTION OF THE DRAWINGS

Further characteristics and advantages of the invention shall become clearer from the detailed description of a container for cooking food, illustrated as an indication, and not for limiting purposes, in the attached drawings in which.

DETAILED DESCRIPTION OF THE INVENTION

Figure 1:
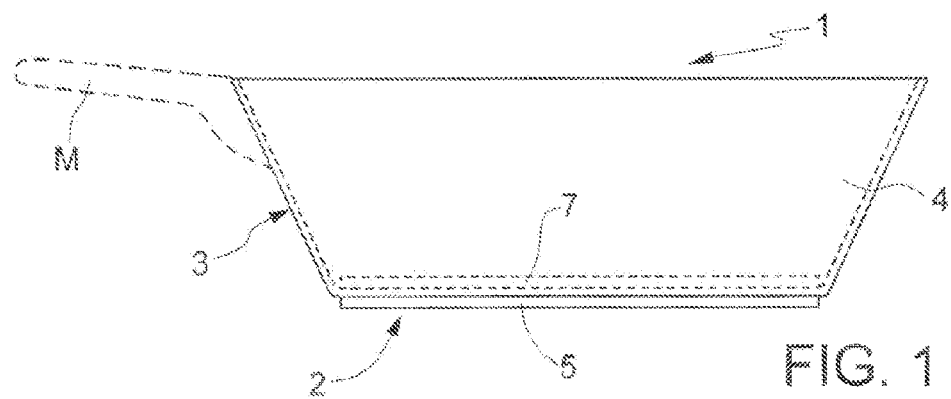
FIG. 1 is a side view of the container for cooking food according to the invention.

With particular reference to FIG. 1, reference numeral 1 wholly indicates a container for cooking food according to the present invention.

FIG. 1 illustrates, in a schematic manner, a generic container for cooking food defining a bottom 2 and a side wall 3. Of course, the bottom 2 and the side wall 3 can have different dimensions and proportions, so as to make for example saucepans, pans, frying pans of various sizes, without any limitation.

The container 1 can be provided with any further element or accessory, such as a permanent handle M, that can be fixed with means and techniques that are known in the field, or for example also a handle or removable grip.

The dimensions and the proportions of the container 1 illustrated in FIG. 1 are completely indicative, only having the purpose of illustrating the characteristics of the present invention.

The container 1 comprises a first substantially concave element 4, in other words substantially bowl-shaped, made from a first metal material, and a second element 5, made from a second metal material, fixed below an area 6 of the first element 4 which corresponds to the bottom 2 of the container 1.

The second element 5 is, for example, discoidal-shaped, rectangular, or of any other suitable shape. According to one aspect of the present invention, the container 1 also comprises a third element 7, also made from the aforementioned second metal material or from a third metal material with characteristics that are similar to those of the second one, fixed above the area 6 of the first element 4, i.e. on the opposite side with respect to the second element 5. The presence of this third element 7 makes it possible to obtain important technical advantages which shall be described in greater detail in the rest of the description.

The third element 7 preferably has the same shape and the same surface as the second element 5, but it can also have other shapes and have a different surface, in relation to the specific application requirements.

In the rest of the description we shall moreover illustrate the process of fixing the second element 5 and the third element 7 to the first element 4.

The first metal material, with which the first element 4 is made, is of the non-ferromagnetic type. More in detail, such a first metal material is made up of aluminum, or of an aluminum alloy, or again, more in general, of another metal material, or metal alloy, characterized by high thermal conductivity, good machinability and possibly suitable for coming into contact with food products.

The second metal material, on the other hand, with which at least the element nearest to the electromagnetic induction plate is made, i.e. at least the second element 5, is of the ferromagnetic type.

The third element 7 can be made from the same metal material as the second element 5, i.e. the second material of the ferromagnetic type, or also from a third metal material with mechanical characteristics that are similar to those of the second material, but non ferromagnetic.

More in detail, the second metal material of the ferromagnetic type can comprise a ferromagnetic stainless steel, for example AISI 430 ferritic stainless steel can be used. The third metal material of the non-ferromagnetic type can comprise an austenitic stainless steel, for example a stainless steel AISI 304 can be used, or again an aluminum alloy for example of the series 1000, 3000, 4000, 5000, 8000, in any case suitable for coming into contact with food products, can be used.

More in general, metals of the non-ferromagnetic type can be used suitable for use in the food industry, i.e. having certain requirements such as the high corrosion resistance and other known requirements. The magnetic properties of the second element 5 allow the container 1 to be used on heat sources such as induction plates and the like, but also on other heat sources, without any limitation.

The second element 5 and the third element 7 have a thickness of between around 0.3 mm and around 2 mm. Preferably, such a thickness is of between around 0.4 mm and 0.8 mm.

Figure 2:
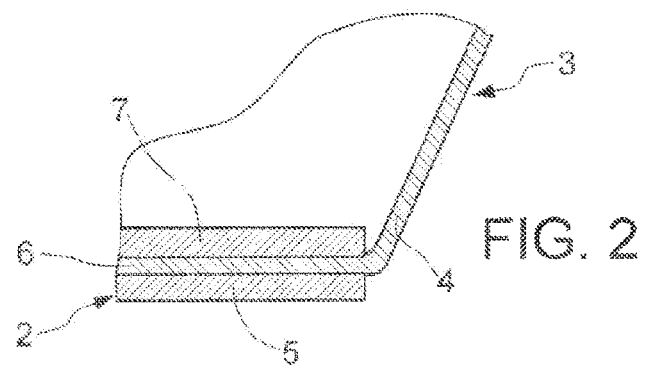
FIG. 2 is a detail of a diametrical section of the container of FIG. 1.

As illustrated in the detail of FIG. 2, the second element 5 and the third element 7 can be fixed to the first element 4 so that their peripheral edges substantially coincide with the connection point between the bottom 2 and the side wall 3 of the container 1; in other words, they substantially have the same extension as the area 6 of the first element 4 intended to constitute the bottom 2. In alternative embodiments, the second element 5 and the third element 7 can have a smaller or larger extension with respect to the area 6 of the first element 4. In the case in which the extension of the elements 5, 7 is greater, the material is arranged along the curvature of the first element 4.

Figure 8:
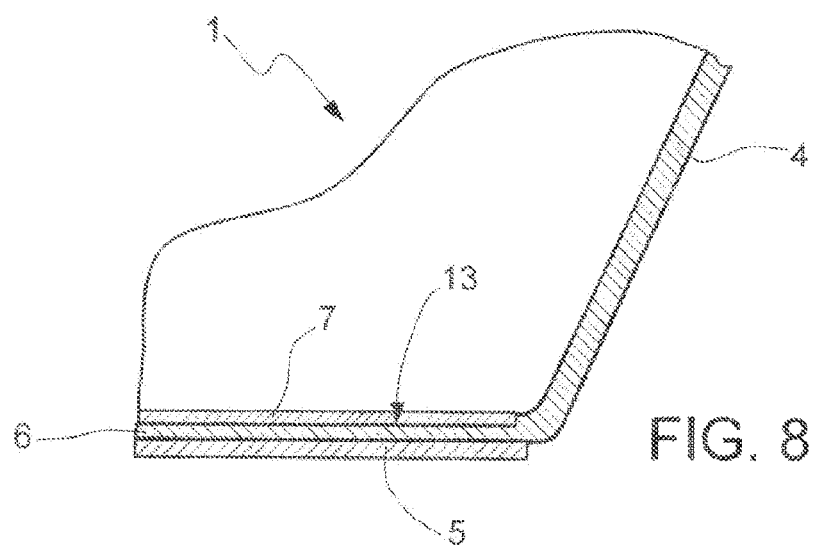
FIG. 8 is a section of a detail of another embodiment of the container according to the invention.

Another embodiment of the container for cooking food according to the present invention is illustrated in FIG. 8.

In this embodiment, the first element 4 can be provided with an inner seat 13 for housing the third element 7.

The second element 5 is on the other hand fixed to the first element 4 according to modalities that have already been described in the previous embodiment. The inner seat 13 preferably has a depth that is similar to the thickness of the third element 7. Thanks to the presence of such an inner seat 13, when the product is finished, the inner surface of the container 1 is substantially smooth and without steps or rough protuberances, which could lead to the undesired accumulation of the food that is being cooked.

Figure 9:
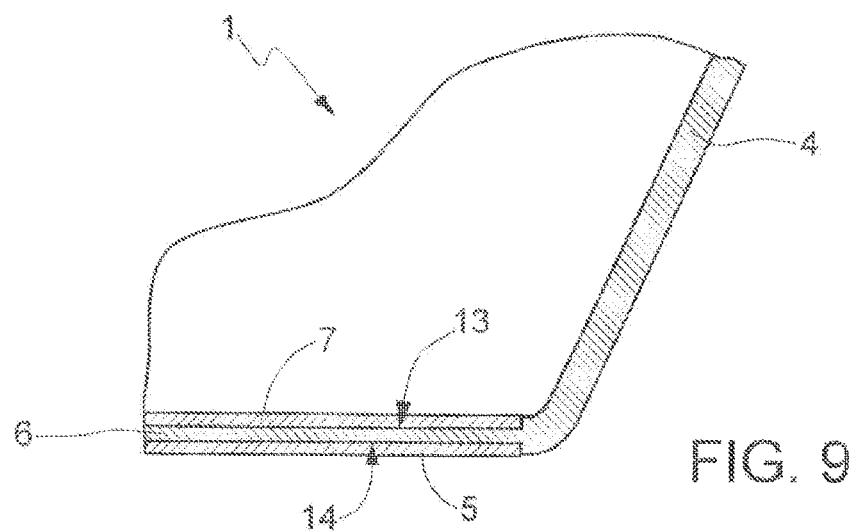
FIG. 9 is a section of a detail of yet another embodiment of the container according to the invention.

Yet another embodiment of the container for cooking food according to the present invention is illustrated in FIG. 9.

This further embodiment forms, in practice, an advantageous evolution of the previous embodiment of FIG. 8.

In this embodiment, indeed, the first element 4 can be equipped with an inner seat for the third element 7, and with an outer seat 14 for housing the first element 5.

The outer seat 14 is opposite the inner seat 13.

The further presence of the outer seat 14 ensues that also the outer surface of the container 1 is substantially smooth and without steps and rough protuberances, so as to facilitate cleaning of the object.

Figure 12:
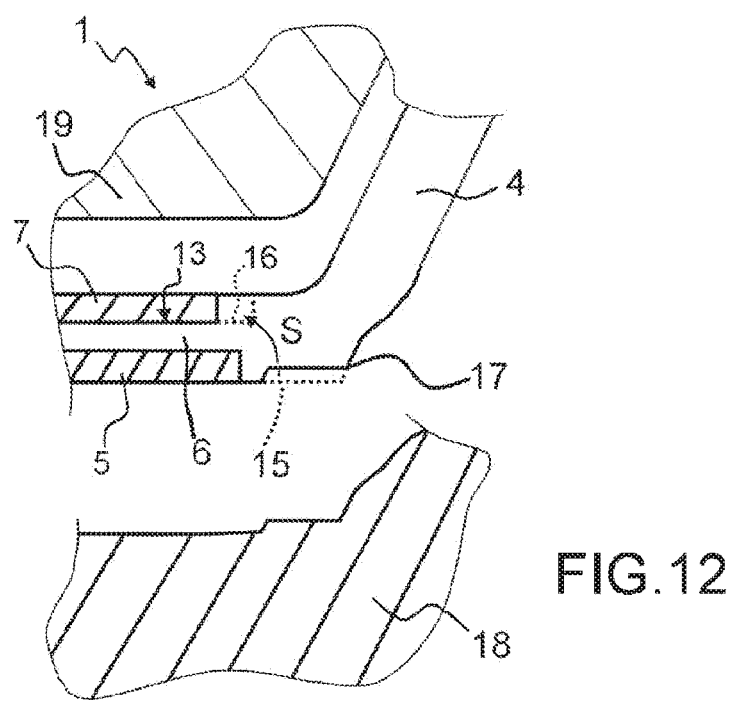
FIG. 12 is a section of a detail of a further embodiment of the container according to the invention.

A further embodiment of the container for cooking food according to the present invention is illustrated in FIG. 12.

In this embodiment the first element 4, when it is at the unrefined or semi-finished state, comprises a supplementary annular portion 15 positioned near to the perimeter of the second element 5.

The supplementary annular portion 15 forms the continuous solid part of the element 4.

The supplementary annular portion 15 can be obtained through machining that is simultaneous to the forming of the first element 4 or through forming of the first element 4 and a subsequent machining thereof, such as for example chip removal or moulding or coining, etcetera.

The supplementary annular portion 15 is obtained previously to the final forming of the container 1. Moreover, the first element 4 can also comprise an inner seat 13 for the third element 7.

During the step of forming the container 1 the supplementary annular portion 15 flows and is redistributed, substantially with a movement that is indicated with the arrow "S", from the outer portion of the first element 4 towards the inner portion of the first element 4 itself, near to the perimeter of the third element 7.

Such a movement of the supplementary annular portion 15 is obtained through the action of a punch 19 and of a matrix 18 which act on the first element 4, as shown in FIG. 12.

The second element 5 can moreover have an area that is greater with respect to the third element 7 as shown in FIG. 12.

In this embodiment, just like in the previous ones, the second element 5 and the third element 7 can have the same or different thickness.

Figure 10:
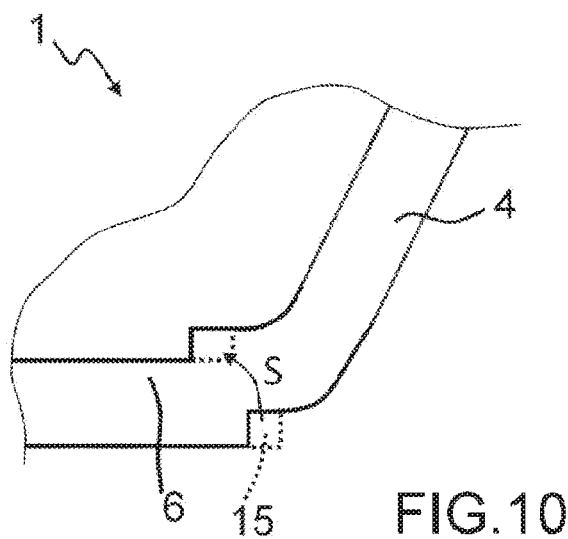
FIG. 10 is a section of a detail of a further embodiment of the container according to the invention.
Figure 11:
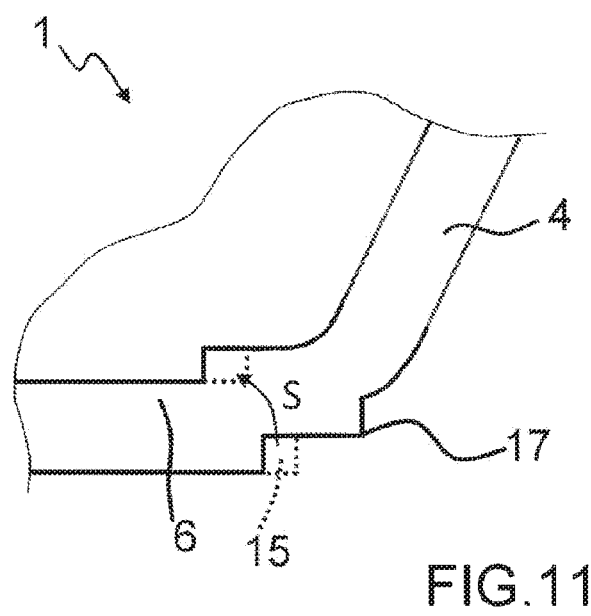
FIG. 11 is a section of a detail of yet a further embodiment of the container according to the invention.

As visible in FIGS. 10 and 11, a section view of a detail of the container 1 is shown, in which the second element 5 and the third element 7 have been omitted for the sake of clarity and in which it is easier to understand the translation of the supplementary annular portion 15 inside the element 4.

In this way it is possible to avoid a possible formation of steps or cavities 16 near to the third element 7, as shown in FIG. 12.

The seat 13, indeed, during the step of forming the container 1 could widen and deform leaving a groove between the first element 4 and the third element 7.

Such a groove, in addition to having an unpleasant appearance, could lead to the unpleasant accumulation of food when cooking, capturing dirt.

For the aforementioned and further reasons such a groove is considered a defect, and could, therefore, cause a considerable amount of waste, thus increasing the production costs, or it could make further elimination machining necessary, consequently reducing the cost-effectiveness of the production cycle.

The supplementary annular portion 15 therefore makes it possible to obtain, in the forming step, a better adhesion and a complete contiguity between the first element 4 and the third element 7. Moreover, the third element 7 after the forming of the container 1 is flush with the first element 4.

The first element 4 can be further equipped with an external step 17, as shown in FIGS. 11 and 12, which makes it possible to facilitate the forming of the first element 4 itself in the unrefined or semi-finished state, and to improve the appearance of the finished shape of the container 1 after the forming thereof.

Figure 13:
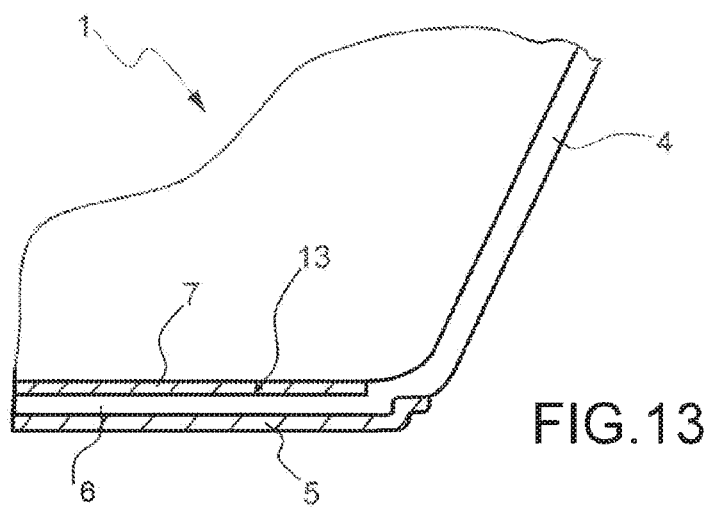
FIG. 13 is a section of a detail of yet another embodiment of the container according to the invention.

A further embodiment of the container for cooking food according to the present invention is illustrated in FIG. 13.

This embodiment constitutes a further variant of the previous embodiment of FIG. 12.

In this embodiment the second element 5, which has an area that is greater than the third element 7, is deformed in the forming step of the container 1.

The second element 5 after the forming step is not only flat but shaped so as to contribute with its thickness to move a greater amount of supplementary annular portion 15 from the outer portion of the first element 4 towards the inner portion of the first element 4 itself, near to the third element 7. In such a way the formation of cavities between the first element 4 and the third element 7 is avoided. In this embodiment, just like in the previously described variants, both the outer and inner surface of the first element 4, respectively placed in contact with the second element 5 and the third element 7, can have a surface roughness with a value Ra that is greater than 0.5 μm. Such a value of surface roughness makes it possible to obtain a better and more effective adhesion of the first element 4 both to the second element 5 and to the third element 7 during the forming of the container 1. Such a roughness can be obtained through known machining processes for example sandblasting, brushing, sanding, glazing, etcetera.

Moreover, at least the surface of the second element 5 and at least a surface of the third element 7 which are placed in contact with the first element 4 can have a surface roughness with a value Ra that is greater than 0.5 μm. Such a value of roughness makes it possible to obtain a better and more effective adhesion both of the second element 5 and of the third element 7 to the first element 4 during the forming of the container 1. Such a roughness can be obtained through known machining processes for example sandblasting, brushing, sanding, glazing, etcetera.

In the rest of the description we shall illustrate the process for making the container 1 for cooking food previously described.

Figure 3:
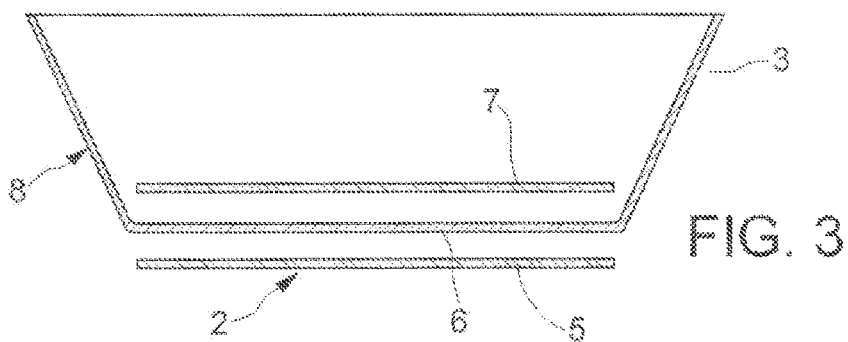
FIG. 3 is a sectioned side view of the preparation step of the assembly comprising the first, the second and third element which will later form the container.

The process initially foresees a step of providing an assembly, wholly indicated with reference numeral 8 in the schematic representation of FIG. 3, comprising the first element 4, the second element 5 positioned externally with respect to the area 6 of the first element 4 and the third element 7, positioned internally with respect to the aforementioned area 6.

The first element 4 is preformed, or rather its shape is substantially bowl-shaped, the inner seat 13, and the supplementary annular portion 15, when foreseen, are conferred in previous machining processes of the known type, which will not be described any further. The inner seat 13 and/or the supplementary annular portion 15 can be present in the first element 4 even singularly. The first element 4, therefore, comprises at least one side wall 3 and an area 6 intended to constitute the bottom 2, clearly separated from one another by a joint area.

The inner and outer surfaces of the first element 4 before being placed in contact, respectively, with the third element 7 and the second element 5 can undergo one or more machining processes so as to obtain a surface roughness with a value Ra that is greater than 0.5 μm.

The thicknesses of the second element 5 and of the third element 7 are preferably those mentioned previously.

At least the surfaces both of the second element 5 and of the third element 7 which are positioned in contact with the first element 4, can undergo, before being placed in contact with the first element 4, one or more machining processes so as to obtain a surface roughness with a value Ra that is greater than 0.5, previously to the forming of the assembly 8.

Subsequently, the assembly 8, thus made, is heated to a certain temperature for a certain period of time, using heating means known in the field, which shall not be described any further here.

Such a step of heating the assembly 8 is carried out at a temperature of between around 200° C. and around 550° C., and preferably between 330° C. and 500° C.

After the heating step, the assembly 8 is mounted on a press.

More in detail, the assembly 8 is mounted in a matrix 9 of a press suitable for carrying out the machining processes with the known impact bonding technique. The pressing through the impact bonding technique foresees a beating of the elements 4, 5 and 7 with a press, generating a violent impact and, exploiting the sliding of the element in a material that is more deformable, in the specific case the first element 4, on the other two harder elements 5 and 7, makes it possible to obtain a perfect union of the aforementioned elements 4, 5 and 7.

It should be underlined that the press for impact bonding must have a certain sufficiently high translation velocity, so that the permanent connection of the elements 4, 5 and 7 occurs effectively and safely. For example, for such a purpose a screw press, a knee or hydraulic type press can be used.

Figure 5:
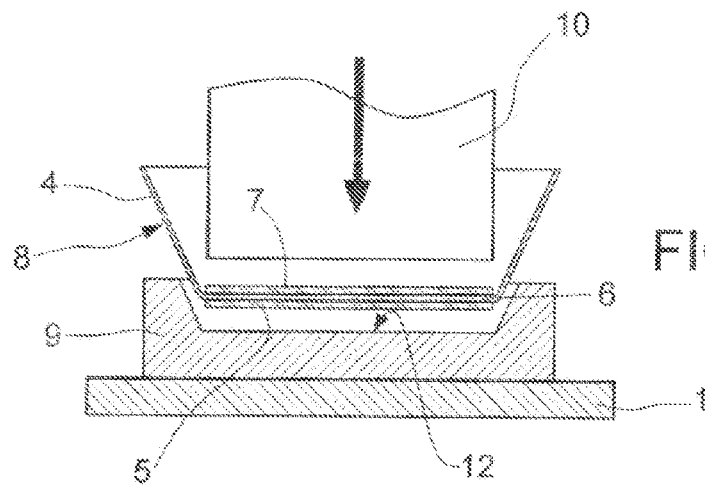
FIG. 5 is a partially sectioned side view of the pressing step of the first, second and third element in pressing machinery.

In FIG. 5 the matrix 9 is mounted on a press, with a punch 10 and a matrix-bearer associated 11.

It should be moreover underlined that the matrix 9, the punch 10 and the supports 11 do not constitute the object of the present invention, since any equipment—of the mould type—known and widespread in the field of producing containers for cooking can be used for the purpose, provided that they are correctly designed and modelled so as to obtain the correct coupling of the assembly.

The assembly 8 is positioned in the matrix 9, as illustrated in FIG. 5, substantially resting on the second element 5, for example in a special shaped seat 12 foreseen in the matrix 9.

The first element 4, the second element 5 and the third element 7 can be positioned in the matrix 9 simply on top of one another, possibly held in a centered position through known type of centering means.

After the positioning of the assembly 8 in the matrix 9, the pressing of the assembly 8 itself is carried out with the known impact bonding technique, so as to obtain the permanent connection of the second element 5 and of the third element 7 to the first element 4 at the area 6. The operative modes of a press using the impact bonding technique to obtain the connection of metal elements, and the effects on the product, are per se known, and shall not be further described here.

In detail, the pressing can be carried out, as illustrated in FIG. 5, by bringing the punch 10 directly in contact with the third element 7.

The aforementioned step of pressing the assembly 8 with the impact bonding technique is carried out with a pressure of between around 1000 tonnes and 5000 tonnes.

Moreover, such a pressing step is carried out with an impact velocity that is greater than 2 m/min, so as to obtain a satisfactory result.

The assembly 8 in output from the pressing, which is thus a single piece, can then be introduced into a standard machining cycle of containers for cooking food.

In one of its embodiments, therefore, the process comprises, in addition to the steps previously described, or also only some of them, providing the first element 4, when it is in the solid state, with the supplementary annular portion 15 which, therefore, constitutes a continuous solid part of the element 4 itself. The annular portion 15 can be obtained through machining simultaneous to the forming of the element 4, or through the initial forming of the element 4 and a subsequent machining such as for example by chip removal or by moulding or by coining etcetera. It should be underlined that such a machining is prior to the final forming of the container 1.

In one of its embodiments, therefore, the process comprises, in addition to the steps previously described, or also only some of them, at least one mechanical finishing machining step.

In another embodiment the process comprises, in addition to the steps previously described, or also only some of them, a step of welding of the "Goujon" type, for example for applying handles, grips and the like.

In another embodiment the process comprises, in addition to the steps previously described, or also only some of them, at least one step of washing the product.

In another embodiment the process comprises, in addition to the steps previously described, or also only some of them, at least one step of chemical or physical surface treatment, such as pickling, sandblasting and the like.

In another embodiment the process comprises, in addition to the steps previously described, or also only some of them, at least one step of painting the product.

In yet another embodiment the process comprises, in addition to the steps previously described, or also only some of them, at least one step of assembling other components.

It has thus been seen how the invention fully achieves the purpose proposed.

The container according to the present invention has a stable behavior both during the various machining steps for making the finished product and, especially, during the normal use.

Indeed, the presence of a third inner element made from the same material as the second element, or from a material with mechanical characteristics that are similar to those of the second material, associated with the first element in aluminum on the opposite side with respect to the second outer element, ensures that, in the finished container, there are no considerable deformations of the concavity of the bottom, due to the different thermal expansion coefficients of the different materials used. Indeed, the third element compensates such differences and strongly limits the known effects of arching of the bottom, which would lead to a movement away of the latter from the thermal energy source. The three elements 4, 5 and 7 indeed obtain a sandwich structure, in which the intermediate element 4 is held between the elements 5 and 7, outer and inner, respectively.

The possible deformations of the intermediate element 4 are contrasted by the greater stability of the elements 5 and 7, outer and inner.

The deformations of the outer and inner elements 5 and 7, respectively, compensate one another since the aforementioned elements 5 and 7 have mechanical-physical characteristics that are similar and react in a substantially equal and opposite manner to the dilations.

The union between the first element 4, the second element 5 and the third element 7 is advantageously achieved, thanks to the use of the impact bonding technique, through a single step, without the addition of other materials or connection means, in an extremely rapid and cost-effective manner.

Figure 4:
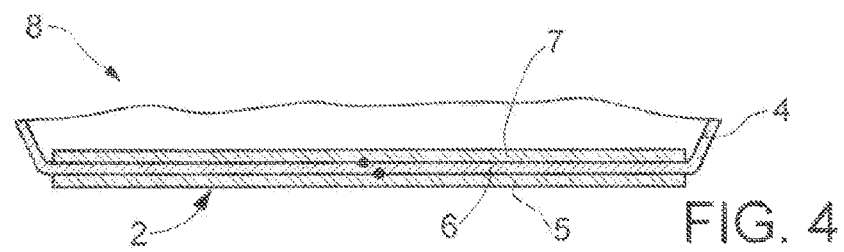
FIG. 4 is a partially sectioned detailed side view of a step of reciprocal connection of the first, second and third element, in another embodiment of the container according to the invention.

In another embodiment—which comprises at least the steps of the first embodiment described, and possibly the further finishing steps—the process comprises a step of pre-connection of the second element 5 and of the third element 7 to the area 6 of the first element 4 through spot welding. Such a step, schematically illustrated in FIG. 4, is actuated in particular before the heating step of the assembly 8. This step makes it possible to obtain, before the heating and before the pressing of the assembly 8, an effective and safe connection between the elements 4, 5 and 7, which are thus reciprocally fixed and centered in the correct machining position, without the risk of moving.

Figure 6:
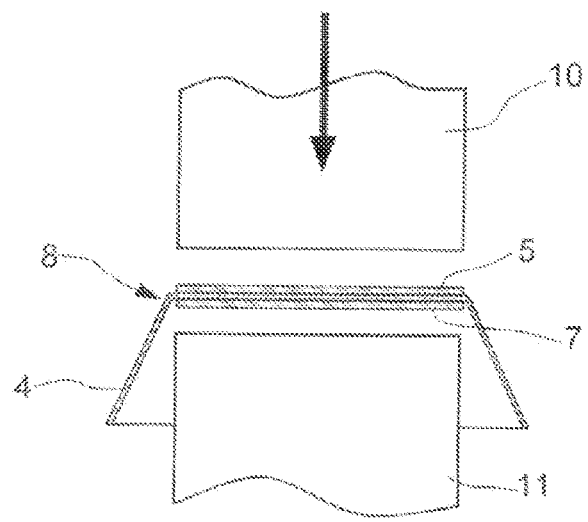
FIG. 6 is a partially sectioned side view of the step of pressing the first, second and third element in pressing machinery in another embodiment of the process according to the invention.
Figure 7:
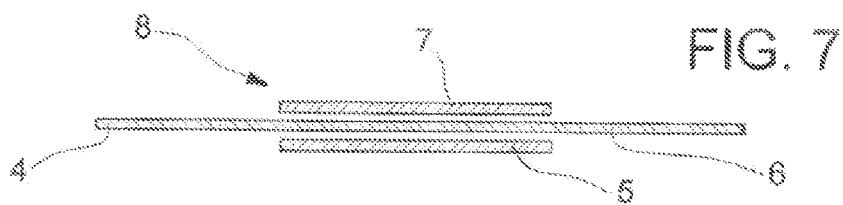
FIG. 7 is a sectioned side view of the preparation step of the assembly comprising the first, second and third element which will later form the container, in another embodiment thereof.

In another embodiment of the process, which comprises at least the steps described in the first embodiment, and possibly further finishing steps, the assembly 8 can be mounted on the press so as to rest on the third element 7 instead of on the second element 5, i.e. with the concavity of the first element 4 facing downwards: this situation is illustrated in FIG. 6. In yet another embodiment of the process according to the invention, which comprises at least the steps described in the first embodiment, and possibly further finishing steps, the first element 4 is not bowl-shaped, but rather substantially flat, as illustrated in FIG. 7, and is for example disc shaped, rectangular, or has yet other shapes. Thanks to this, some steps of the process can be easier and simple, since it is necessary to manipulate a flat object rather than concave.

In this embodiment, therefore, the process comprising a step, subsequent to that of impact bonding, of forming of the assembly 8, so as to confer a suitable concavity to the latter, i.e. so as to make a side wall and a bottom at the area 6 for fixing the second element 5 and the third element 7.

The present invention thus conceived can undergo numerous modifications and variants all covered in the scope of protection of the following claims.

The invention claimed is:

1. A process for making a container for cooking food, comprising the steps of:
   providing an assembly comprising at least a first element in a first metal material having an area intended to constitute a bottom of said container, at least one second element in a second metal material positioned externally with respect to said area and at least one third element positioned internally with respect to said area;
   providing said first element, when it is in its unrefined or semi-finished state, of a supplementary annular portion constituting a continuous solid part of said element, positioned near to the perimeter of said second element;
   heating said assembly to a predetermined temperature;
   mounting said assembly in a press;
   pressing said assembly with an impact bonding technique so as to connect said second element and said third element to said first element at said area; flowing said supplementary annular portion through the action of a punch and of a matrix acting on said first element; and
   moving and redistributing said supplementary annular portion from the outer portion of said first element towards the inner portion of said first element itself, near to the perimeter of said third element, through the action of said punch and of said matrix acting on said first element.

2. The process according to claim 1, wherein said first metal material is of the non ferromagnetic type.

3. The process according to claim 1, in which said second metal material is of the ferromagnetic type.

4. The process according to claim 1, in which said third element is made from said second metal material, or from a third metal material.

5. The process according to claim 1, wherein said first material comprises aluminum or aluminum alloy.

6. The process according to claim 1, wherein said second material comprises a ferromagnetic stainless steel.

7. The process according to claim 1, wherein said third metal material comprises a non-ferromagnetic stainless steel.

8. The process according to claim 1, wherein said third metal material comprises aluminum or aluminum alloy.

9. The process according to claim 1, wherein said step of heating said assembly is carried out at a temperature of between 250° C. and around 550° C.

10. The process according to claim 1, wherein said step of pressing said assembly is carried out with a pressure of between around 1000 tonnes and 5000 tonnes.

11. The process according to claim 1, wherein said step of pressing said assembly is carried out with an impact velocity that is roughly equal to or greater than 2 m/min.

12. The process according to claim 1, wherein said second element and said third element have a thickness of between around 0.3 mm and around 2 mm.

13. The process according to claim 1, wherein said first element is preformed and comprises at least one side wall.

14. The process according to claim 1, comprising one or more machining processes of at least one portion of the outer and inner surface of said first element before said outer and inner surfaces are, respectively, placed in contact with said second element and said third element, so as to obtain a surface roughness Ra of said inner and outer surfaces that is greater than 0.5 μm.

15. The process according to claim 1, comprising one or more machining processes of at least one of the two surfaces of both said second element and of said third element, before said machined surfaces are placed in contact with said first element, so as to obtain a surface roughness Ra of said surfaces that is greater than 0.5 μm.

16. The process according to claim 1, wherein said providing said first element, when it is in its unrefined or semi-finished state, of said supplementary annular portion comprises the forming of said supplementary annular portion at the same time as the forming of said first element or it comprises the forming of said first element through further machining, such as chip removal, or forming, or coining so as to obtain said supplementary annular portion.

17. The process according to claim 16, comprising making said supplementary portion flow and move near to the perimeter of said third element.

18. The process according to claim 1, wherein said first element is substantially flat.

19. The process according to claim 18, comprising a step of forming said assembly, so as to make at least one side wall and a bottom at said area.

* * * * *